US011880702B2

(12) United States Patent
Sherwin, Jr. et al.

(10) Patent No.: US 11,880,702 B2
(45) Date of Patent: Jan. 23, 2024

(54) HYPERVISOR HOT RESTART

(71) Applicant: Microsoft Technology Licensing, LLC, Redmond, WA (US)

(72) Inventors: Bruce J. Sherwin, Jr., Woodinville, WA (US); Sai Ganesh Ramachandran, Redmond, WA (US)

(73) Assignee: Microsoft Tech nology Licensing, LLC, Redmond, WA (US)

( * ) Notice: Subject to any disclaimer, the term of this patent is extended or adjusted under 35 U.S.C. 154(b) by 0 days.

(21) Appl. No.: 17/882,305

(22) Filed: Aug. 5, 2022

(65) Prior Publication Data
US 2023/0061596 A1 Mar. 2, 2023

Related U.S. Application Data

(63) Continuation of application No. 16/849,695, filed on Apr. 15, 2020, now Pat. No. 11,436,031.

(51) Int. Cl.
| | |
|---|---|
| *G06F 9/455* | (2018.01) |
| *G06F 16/14* | (2019.01) |
| *G06F 16/17* | (2019.01) |
| *G06F 12/1009* | (2016.01) |

(52) U.S. Cl.
CPC ...... *G06F 9/45545* (2013.01); *G06F 9/45558* (2013.01); *G06F 12/1009* (2013.01); *G06F 16/144* (2019.01); *G06F 16/1734* (2019.01); *G06F 2009/45575* (2013.01); *G06F 2009/45591* (2013.01); *G06F 2212/7201* (2013.01)

(58) Field of Classification Search
CPC ............. G06F 9/45545; G06F 9/45558; G06F 12/1009; G06F 2212/7201
See application file for complete search history.

(56) References Cited

U.S. PATENT DOCUMENTS

| | | | | |
|---|---|---|---|---|
| 2012/0254865 | A1* | 10/2012 | Saeki | G06F 8/656 718/1 |
| 2013/0246728 | A1* | 9/2013 | Nishiguchi | G06F 12/145 711/163 |
| 2021/0318900 | A1* | 10/2021 | Gopalan | G06F 9/45558 |

OTHER PUBLICATIONS

Hardik Bagdi; HyperFresh: Live Refresh of Hypervisors using Nested Virtualizaiton; Sep. 2, 2017; ACM (Year: 2017).*
Spoorti Doddamani; Fast and Live Hypervisor Replacement; Apr. 14, 2019; (Year: 2019).*

* cited by examiner

*Primary Examiner* — Dong U Kim
(74) *Attorney, Agent, or Firm* — Workman Nyedgger

(57) ABSTRACT

Hot restart of a hypervisor by replacing a running first hypervisor by a second hypervisor with minimally perceptible downtime to guest partitions. A first hypervisor is executed on a computing system. The first hypervisor is configured to create one or more guest partitions. During the hot restart, a service partition is generated and initialized with a second hypervisor. At least a portion of runtime state of the first hypervisor is migrated and synchronized to the second hypervisor using inverse hypercalls. After the synchronization, the second hypervisor is devirtualized from the service partition to replace the first hypervisor. Devirtualizing includes transferring control of hardware resources from the first hypervisor to the second hypervisor, using the previously migrated and synchronized runtime state.

20 Claims, 15 Drawing Sheets

HYPERVISOR HOT RESTART

CROSS-REFERENCE TO RELATED APPLICATIONS

This application is a continuation of U.S. patent application Ser. No. 16/849,695 filed on Apr. 15, 2020, entitled "HYPERVISOR HOT RESTART," which application is expressly incorporated herein by reference in its entirety.

BACKGROUND

Virtualization in computing often refers to the abstraction of physical components into logical objects. A virtual machine (VM) can virtualize hardware resources, including processors, memory, storage, and network connectivity, and present virtualized resources to a host operating. The process of virtualization of a VM includes at least two parts: (1) the mapping of virtual resources or state, e.g., registers, memory, or files, to real resources in the underlying physical hardware and (2) the use of machine instructions and/or system calls to carry out the actions specified by virtual machine instructions and/or system calls, e.g., emulation of the virtual machine application binary interface (ABI) or instruction set architecture (ISA) interface.

A hypervisor is a software layer that provides the environment (i.e., a virtualized hardware partition) in which the virtual machines operate. A hypervisor sits between the physical resources on a physical hardware computing system and VMs. Without a hypervisor, an operating system communicates directly with the hardware beneath it, i.e., disk operations would go directly to the disk subsystem, and memory calls would be fetched directly from the physical memory. When multiple operating systems of multiple VMs are running simultaneously on a single machine, a hypervisor manages the interactions between each VM and the shared hardware, such that simultaneous control of the shared hardware by multiple VMs is prevented.

When a hypervisor resets or restarts (e.g., due to a software upgrade), all the VMs are running on top of the hypervisor are interrupted (e.g., restarted suspended, etc.), which can significantly impact the workloads and services operating on the VMs.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to hypervisor hot restart, which replaces a first hypervisor with a second hypervisor with little interference to the currently running guest partitions. The embodiments described herein are implemented at a computing system. First, the computing system executes a first hypervisor on the computing system. The first hypervisor is configured to create one or more guest partitions. During a hypervisor soft restart, a service partition is created. A second hypervisor is initialized within the service partition. The service partition is created with an identity mapping between its guest physical address (GPA) space to host physical address (HPA) space. Optionally, it may be bestowed additional privileges over a traditional partition/virtual machine to facilitate its initialization. Any execution environment that can satisfy platform's boot and security requirement is capable of creating and/or initializing the service partition. For example, a component in trusted computing base (TCB) of the computing system, such as the first hypervisor, can be tasked to create or initialize the second hypervisor. During initialization, at least a portion of the state of the first hypervisor is initialized to the second hypervisor. The state of the first hypervisor includes, but is not limited to, (1) static system state, (2) dynamic system state, and (3) logical software state. The static system state includes, but is not limited to, system topology, memory map, and memory layout of the first hypervisor. The dynamic system state includes guest visible hardware architecture state, including but not limited to, general purpose registers, mode control registers. The dynamic system state also includes virtualization instruction set architecture (ISA) specific hardware state, including but not limited to, state of guest VMs, such as virtual central processing unit (CPU) state, second level page tables (also known as nested page tables), and a list of assigned hardware devices (e.g., network card). The logical software state includes, but is not limited to, page frame number (PFN) databases. Since the dynamic system state and logical software state may change constantly during runtime, these states are also called runtime state. Finally, the second hypervisor is devirtualized from the service partition to replace the first hypervisor, and the state of each VM is restored by the second hypervisor.

In some embodiments, at least one of the one or more guest partitions comprises a privileged parent partition, and the parent partition operates a host operating system that includes an orchestrator that is configured to orchestrate the initialization and synchronization of the second hypervisor. In some embodiments, the first hypervisor allows and supports the orchestrator to register and complete certain requests (e.g., hypercalls intercepts, register intercepts) received from the second hypervisor. Since these requests (sent from the second hypervisor to the first hypervisor) are intercepted (e.g., registered and completed) by the orchestrator, such requests are also called "intercepts." In some embodiments, in response to receiving the intercepts, the orchestrator issues "inverse hypercalls" to the second hypervisor following the hypercall application binary interface (ABI) to migrate relevant state. A hypercall is a call from a guest partition to a hypervisor, and an "inverse hypercall" is a call from a privileged software or hardware component (e.g., the orchestrator) to the second hypervisor in a service partition. In some embodiments, the orchestrator may share a portion of a memory page with the first hypervisor and the second hypervisor for communication purposes (e.g., hypercalls, intercepts, and/or inverse hypercalls).

Although the example embodiments are implemented in a special partition (e.g., a service partition) for servicing a hypervisor, the overall techniques of pre-initializing datastructures in a virtual machine and/or migrating/synchronizing runtime state inside a VM/partition, to reduce downtime, offer better uptime and continuity for services, may be used for any portion of OS of any VM.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 6E illustrates a flowchart of an example method for sharing runtime state of the first hypervisor with the second hypervisor;

DETAILED DESCRIPTION

Figure 1A:
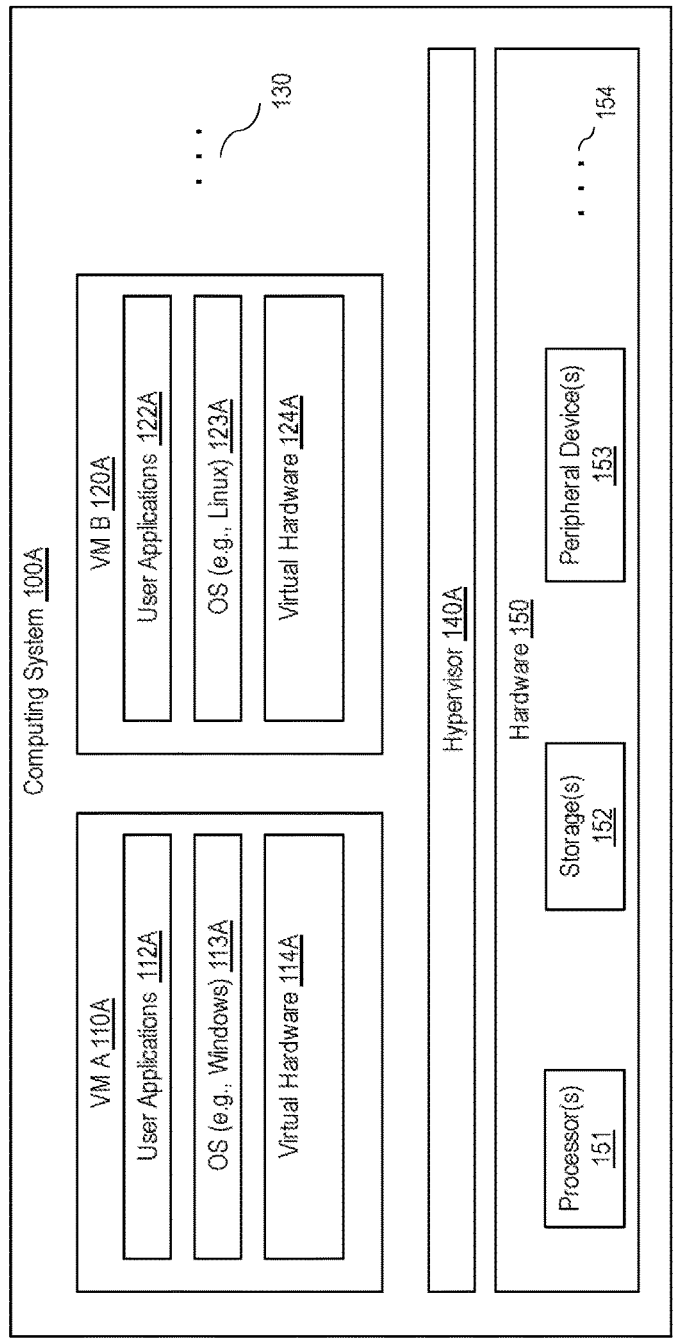
FIGS. 1A and 1B illustrate example computing systems that includes a hypervisor that hosts one or more virtual machines.

The embodiments described herein are related to hypervisor hot restart, which replaces a first hypervisor with a second hypervisor with little interference to the currently running guest partitions. The embodiments described herein are implemented at a computing system. First, the computing system executes a first hypervisor on the computing system. The first hypervisor is configured to create one or more virtual machines/partitions, each of which hosts a guest operating system. During a hypervisor soft restart, a service partition with identity mapped second level page tables is created. A second hypervisor is then initialized within the service partition, and synchronizes with at least a portion of the state of the first hypervisor. Any execution environment that can satisfy platform's boot and security requirements is capable of creating and/or initializing the second hypervisor. For example, a component in the trusted computing base (TCB), such as the first hypervisor, may be tasked to create and/or initialize the service partition.

In some embodiments, the state of the first hypervisor includes, but is not limited to, (1) static system state, (2) dynamic system state, and (3) logical software state. The static system state includes, but is not limited to, system topology, memory map, and memory layout of the first hypervisor. The dynamic system state includes guest visible hardware architecture state, including but not limited to, general purpose registers, mode control registers. The dynamic system state also includes virtualization instruction set architecture (ISA) specific hardware state, including but not limited to, state of guest VMs, such as virtual central processing unit (CPU) state, second level page tables (also known as nested page tables), and a list of assigned hardware devices (e.g., network card). The logical software state includes, but is not limited to, page frame number (PFN) databases. Since the dynamic system state and logical software state may change constantly during runtime, these states are also called runtime state. Finally, the second hypervisor is devirtualized from the service partition to replace the first hypervisor, and the state of each VM is restored by the second hypervisor.

In some embodiments, at least one of the one or more guest partitions comprises a privileged parent partition, and the parent partition operates a host operating system that includes an orchestrator that is configured to orchestrate the initialization and synchronization of the second hypervisor. In some embodiments, the first hypervisor is part of the system's trusted computing base (TCB), and the orchestrator is executed in a trusted execution environment (TEE) to uphold the trustworthiness of inputs generated for the second hypervisor. In some embodiments, the first hypervisor allows and supports the orchestrator to register and complete certain requests received from the second hypervisor. Since these requests (sent from the second hypervisor to the first hypervisor) are intercepted (e.g., registered and completed) by the orchestrator, such requests are also called "intercepts." In some embodiments, in response to receiving the intercepts, the orchestrator issues "inverse hypercalls" to the second hypervisor following the hypercall application binary interface (ABI) to migrate relevant state. A hypercall is typically a call from a guest partition to a hypervisor requesting an operation of appropriate privilege. The switch from guest partition context to the hypervisor context is achieved using a platform specific instruction. On completion of the privileged operation, the control is returned to the guest context from the hypervisor context, against using a platform specific instruction/mechanism. An "inverse hypercall" requests an operation from a privileged component (e.g., the orchestrator) to a hypervisor in a service partition using the hypercall ABI. The switch from the orchestrator to the second hypervisor context is achieved by permitting execution of the service partition's virtual processor with the registers formatted as required by hypercall ABI. Upon completion of the inverse hypercall, the second hypervisor generates a very specific intercept causing a deliberate context switch from the second hypervisor in the service partition back to the orchestrator. In some embodiments, the orchestrator may share one or more memory pages with the first hypervisor and the second hypervisor for communication purposes (e.g., hypercalls, intercepts, and/or inverse hypercalls).

In some embodiments, initializing the second hypervisor includes the first hypervisor generating a loader block for the second hypervisor. The loader block contains a logical construct describing some of static system state for initialization. The static system state includes various system invariants, such as system topology, memory map and layout. The memory map includes an identity map of substantially all system memory. In some embodiments, the identity map includes at least the memory visible to the first hypervisor that is being replaced. For example, in some cases, the first (old) and second (new) hypervisors both know about all of the memory in the system. In some cases, at least one of the first and/or the second hypervisors does not know about all memory, e.g., when some RAM, containing errors, needs to be offlined, or the second (new) hypervisor will need to know about new memory that is hot-added during a hot restart. The orchestrator obtains one or more system invariants of the computing system, which includes at least one or more features supported by the hardware resources of the computing system (1) from the hardware or system resource(s) directly, when the specific resource is not virtualized by the hypervisor, and/or (2) from the first hypervisor, when the orchestrator's access to the underlying physical hardware resource is virtualized by the first hypervisor. In some embodiments, the orchestrator migrates relevant system invariants via inverse hypercalls. The second hypervisor is then initialized based on the shared one or more system invariants. In some embodiments, initializing the second hypervisor may also include offering the second hypervisor read-only specific access to certain physical resources.

After the second hypervisor is initialized with the static system state in the service partition, the computing system then migrates the runtime state of the first hypervisor to the second hypervisor and keeps it synchronized. The runtime state includes at least dynamic system state and logical software state. The synchronizing the runtime state of the first hypervisor may include the orchestrator gathering runtime state of the first hypervisor and sharing/migrating the runtime state with the second hypervisor over inverse hypercalls. As mentioned above, the dynamic system state includes guest visible hardware architecture state, including but not limited to, general purpose registers, mode control registers. The dynamic system state also includes virtualization instruction set architecture ISA specific hardware state, including but not limited to, state of guest VMs, such as virtual central processing unit (CPU) state, second level page tables (also known as nested page tables), and a list of assigned hardware devices (e.g., network card). The logical software state includes, but is not limited to, page frame number (PFN) databases. The second hypervisor then duplicates the shared second level memory page tables and/or PFN databases and leaves them dormant until it eventually devirtualizes.

Additionally, during this synchronization, the guest partitions running atop the first hypervisor continue to operate and issue hypercalls to the first hypervisor. Accordingly, after the initial synchronization of computationally intensive state, additional incoming hypercalls to the first hypervisor that impact previously transmitted state may also need to be synchronized to the second hypervisor. In some embodiments, such state changes are also transmitted using inverse hypercalls.

Once the first hypervisor and the second hypervisor are completely or substantially synchronized, the second hypervisor is then devirtualized. In some embodiments, the devirtualization includes the first hypervisor "trampolining" to the second hypervisor and ceding all physical hardware control to the second hypervisor. "Trampolines" are sometimes referred to memory locations holding addresses pointing to interrupt service routines, I/O routines, etc. Here, "trampolining" is referred to a transfer of control of all physical hardware from the first hypervisor to the second hypervisor. In some embodiments, trampolining may be achieved by reusing an existing control transfer mechanism of the computing system for Kernel Soft-Reboot. In some embodiments, no other system or user software, barring system firmware, is permitted to execute during the trampoline process. However, direct memory accesses (DMAs) programmed prior to devirtualization may continue to be in flight and complete. In some embodiments, the second hypervisor may undergo additional initialization, validate hardware state, re-initialize hardware, and/or initialize new hardware not previously programmed by the first hypervisor. The devirtualization may also include freezing each of the guest partitions currently running atop the first hypervisor and transmitting a final state of the first hypervisor to the second hypervisor. Thereafter, each of the guest partitions is switched onto the second hypervisor. The second hypervisor then thaws each of the guest partitions. The memory foot print of the first hypervisor may be eagerly or lazily reclaimed by the computing system, subject to overall memory pressure.

Because the embodiments described herein are implemented in a VM environment that is capable of supporting multiple guest partitions simultaneously, each running its own operating system and associated application programs, some introductory discussion of virtualization and hypervisors will be described with respect to FIGS. 1-4.

Hypervisor-based virtualization often allows a privileged host operating system (operating in a "parent" partition), as well as multiple guest operating systems (operating in "child" partitions), to share access to hardware of a single computing system simultaneously, with each operating system being given the illusion of having access to a full set of system resources. In order to create this illusion, in some embodiments, a hypervisor at a computing system creates multiple partitions that operate as virtual hardware machines (i.e., VMs), each running its own operating system and associated application programs. Each operating system controls and manages a set of virtualized hardware resources.

FIG. 1A illustrates an example computing system 100A that includes a hypervisor 140A that hosts one or more VMs 110A, 120A. The computing system 100A includes various hardware devices 150, such as one or more processors 151, one or more storage devices 152, and/or one or more peripheral devices 153. The peripheral devices 153 may be configured to perform input and output (I/O) for the computing system 100A. The ellipsis 154 represents that there may be different or additional hardware devices included in the computing system 100A. Hereinafter, the physical hardware 150 running the hypervisor 140A is also referred to as the "host computing system" 100A (also referred to as a "host"), and the VMs 110A, 120A hosted on the hypervisor 140A are also referred to as the "guest partitions" (also referred to as a "guest").

As illustrated in FIG. 1A, the hypervisor 140A hosts one or more guest partitions (e.g., VM A 110, VM B 120). The ellipsis 130 represents that there may be any number of guest partitions contained at the computing system 100A. The hypervisor 140A allocates to each of the guest partition 110A, 120A a portion of the computing system 100A's physical hardware resources 150 and gives the guest partitions 110A, 120A an illusion of owning the resources 114A, 124A. These "illusive" resources are called "virtual" resources. Each of the VMs 110A, 120A uses its own virtual resources 114A, 124A to run its own operating system (OS) 113A, 123A. The operating system 113A, 123A can then allocate the virtual resources 114A, 124A to its various user applications 112A, 122A. For example, guest partition 110A runs OS 113A and user applications 112A. If the OS 113A is a Windows® operating system, the user applications 112A would be Windows® applications. As another example, VM 120A runs OS 123A and user applications 122A. If the OS 123A is a Linux operating system, the user applications 122A would be Linux applications.

Each virtual hardware resource 114A, 124A may or may not have a corresponding physical hardware resource 150. When a corresponding physical hardware resource 150 is available, the hypervisor 140A decides how access will be provided to guest partitions 110A, 120A requiring its use. For example, the resource 150 may be partitioned or may be time shared. When a virtual hardware resource 114A, 124A does not have a matching physical hardware resource, the hypervisor 140A may emulate the action of the desired hardware resource, typically via a combination of software and other hardware resources that are physically available on the host computing system 100A.

As illustrated in FIG. 1A, in some embodiments, the hypervisor 140A may be the only software that executes in the highest privilege level defined by the system architecture. Such a system is called a native VM system. Conceptually, in a native VM system, the hypervisor 140A is first installed on the bare hardware, and the guest partitions VM A 110A and VM B 120A are then installed on top of the hypervisor 140A. The guest operating systems 113A, 123A and other less privileged applications 112A, 122A run in levels of privilege lower than that of the hypervisor. This typically means that the privilege level of the guest OS 113A, 123A is likely emulated by the hypervisor 140A.

Alternatively, in some embodiments, a hypervisor is installed on a host platform that is already running an existing OS. Such a system is called a hosted VM system. In a hosted VM system, the hypervisor utilizes the functions already available on the host OS to control and manage resources desired by each of the guest partitions. In a hosted VM system, the hypervisor may be implemented at a user level or a privilege level similar to the host operating system. Alternatively, a portion of the hypervisor is implemented at a user level, and another portion of the hypervisor is implemented at the privileged level.

Figure 1B:
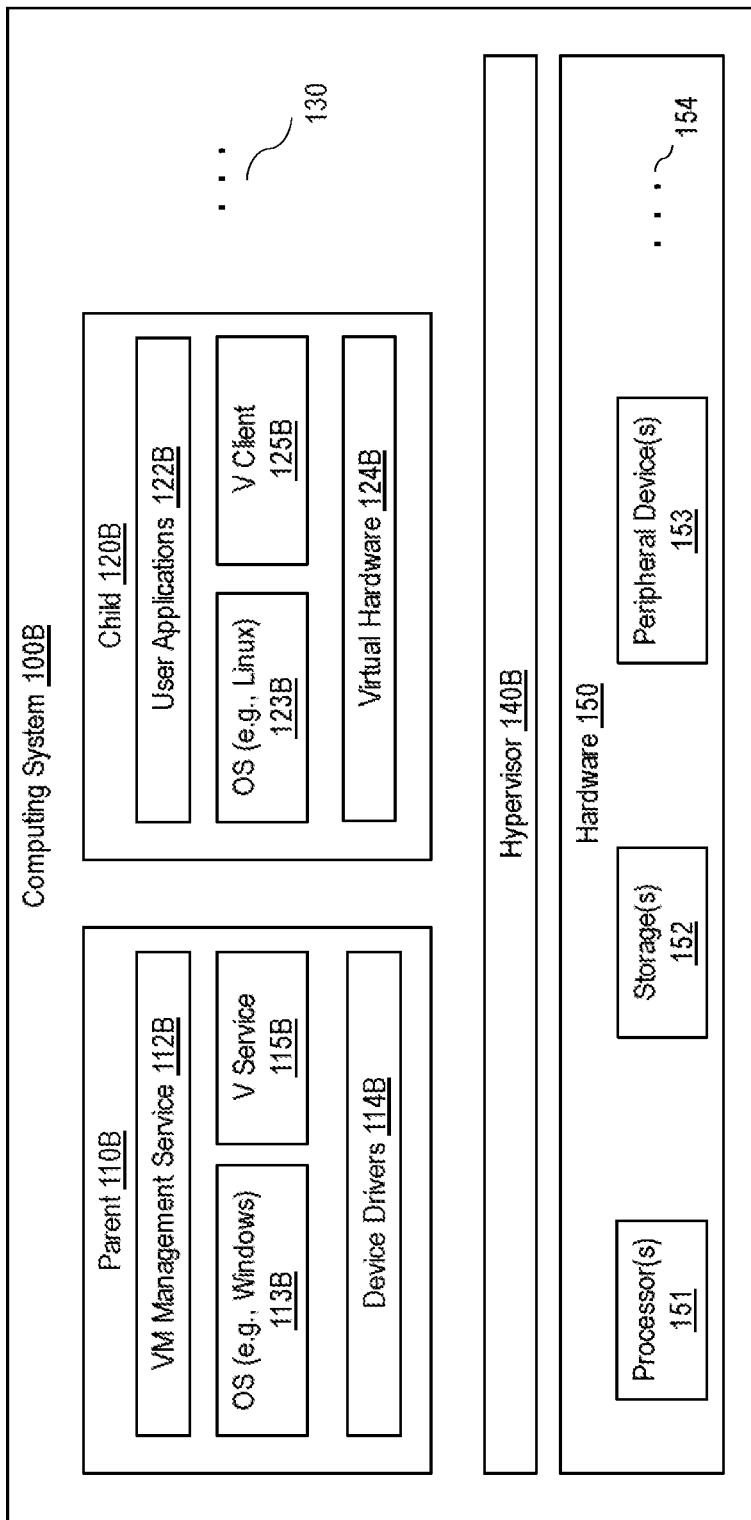

In some embodiments, one of the guest partitions running on the same computing system may be considered more privileged than the others. FIG. 1B illustrates such an example embodiment, in which the more privileged guest partition may be called a parent partition 110B, and the rest of the partitions are called child partitions 120B. In some embodiments, the parent partition 110B includes an operating system 113B and/or a virtualization service module 115B. Each of the operating system.113B and/or the virtualization service module 115B may have direct access to the hardware devices 150 via device drivers 114B. Thus, the operating system 113B may also be called a host operating system. Further, the virtualization service module 115B may be capable of creating child partitions 120B using hypercalls. Depending on configuration, the virtualization service module 115B may expose a subset of the hardware resources to each child partition 140B via a virtualization client module 125B. The child partition 120B generally does not have direct access to the physical processor and/or cannot handle real interrupts. Instead, the child partition 120B may use the virtualization client module 125B to obtain a virtual view of the virtual hardware resources 124B.

In some embodiments, the parent partition 110B may also include a VM management service application 112B, which may allow users (e.g., a system administrator) to view and modify the configurations of the virtualization service module 115B. For example, the hypervisor 140B may be a Microsoft® Hyper-V hypervisor, and the parent partition may run a Windows® server. The user interface of the parent partition may provide a window displaying the full user interface of the child partition(s) 120B. Interactions with applications running on a child partition120B may take place within the window. When the host operating system 113B is Windows®, a graphical window could be established on the desktop interface to interact with a child partition 120B on the same platform. The elements 113B, 122B, 123B, and/or 124B of FIG. 1B are similar to the elements113A, 122A, 123A, and/or 124A of FIG. 1A, therefore, will not be further discussed.

Regardless of whether it is a native VM system or a hosted VM system, the relationship between the hypervisor and guest partitions is generally analogous to the relationship between an operating system and application programs in a conventional computing system. In a conventional computing system, the operating system typically works in a privileged level higher than that of the applications, e.g., in kernel mode versus user mode. Similarly, in the VM environment, the hypervisor also operates in a privileged mode higher than the mode of the guest partitions. When a guest partition needs to perform a privileged operation, such as updating page tables, the guest partition will use a hypercall to request such an operation, just as a system call in a conventional operation.

Accordingly, the inventive embodiments described in are applicable to both native VM systems and hosted VM systems, and the term "hypervisor" herein is referred to a hypervisor implemented in any type of VM systems.

To further understand how a hypervisor operates, we also need to understand how the hypervisor maintains each guest partition's state. In a computing system, the architected state of the computing system is contained within, and maintained by, the hardware resources of the computing system. There is usually an architected hierarchy of state resources, ranging from registers at one end of the hierarchy to secondary storage (e.g., hard drives) at the other end of the hierarchy.

In a VM environment, each guest partition has its own architected state information, and there may or may not be adequate physical resources in the host computing system to map each element of a guest's state to its natural level in the host's memory hierarchy. For example, a guest's register state may actually be held in the main memory of the host platform as part of a register context block.

In normal operations, the hypervisor 140A periodically switches control amongst the guest partitions 110A, 120A. As operations on the guest's state are performed, the state maintained on the host computing system 100A is modified just as it would be on the guest operating system 113A, 123A. In some embodiments, the hypervisor 140A constructs an isomorphism that maps a state of virtual guest operating system 113A, 123A to a state of physical host computing system 100A.

Figure 2:
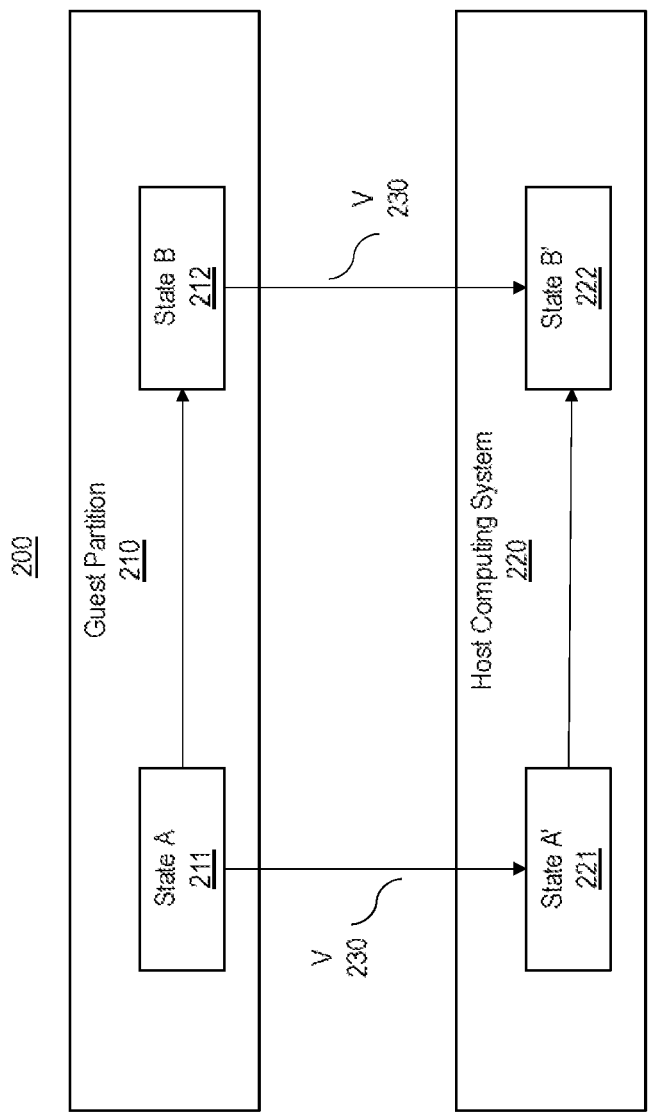
FIG. 2 illustrates a schematic diagram of an isomorphism between a guest partition and a host computing system.

FIG. 2 illustrates a schematic diagram of an isomorphism 200 between a guest partition 210 and a host computing system 220. The isomorphism 200 maps the guest state(s) 211, 212 to the host state(s) 221, 222 using function 230, i.e., V(State A)=State A', and V(State B)=State B'. For a sequence of operations in the guest partition 210 that modifies the state of the guest partition 210 from State A 211 to State B 212, there is a corresponding sequence of operations in the host computing system 220 that modifies the state of the host computing system from State A' 221 to State B' 222. The isomorphism 200 between a guest partition 210 and the host computing system 220 is managed by a hypervisor (e.g., 140A, 140B).

Figure 3A:
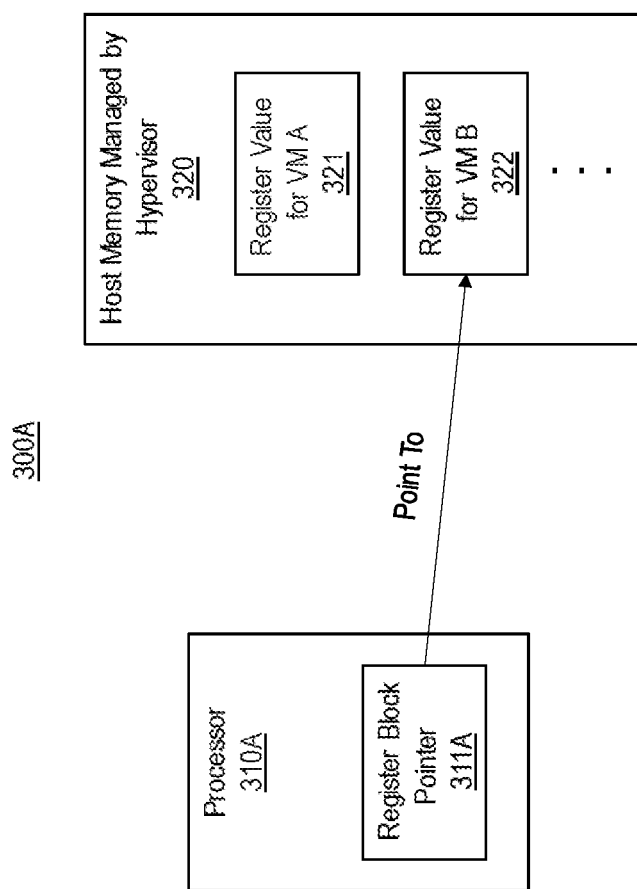
FIGS. 3A and 3B illustrate example embodiments of VM state management.

In embodiments, there are two basic ways of managing guest states so that this VM isomorphism is accomplished. One way is to employ a level of indirection, by holding the state for each guest in fixed locations in the host computing system's memory hierarchy with a hypervisor managed pointer indicating the guest state that is currently active. As the hypervisor switches among guest partitions, it changes the pointer to match the current guest. FIG. 3A illustrates such an example embodiment 300A of state management by indirection. Referring to FIG. 3A, the host computing system's memory 320 managed by hypervisor stores register value for each VMs A and B in the register context block 321, 322. The register block point 311A of the processor 310A points to the register context block 322 of the currently active guest partitions (e.g., VM B). When a different guest partition is activated, the hypervisor changes the pointer 311A stored at the processor to point to the register context block 321, 322 of the activated guest partition, and loads program counter to point to the activated VM program and start execution.

Figure 3B:
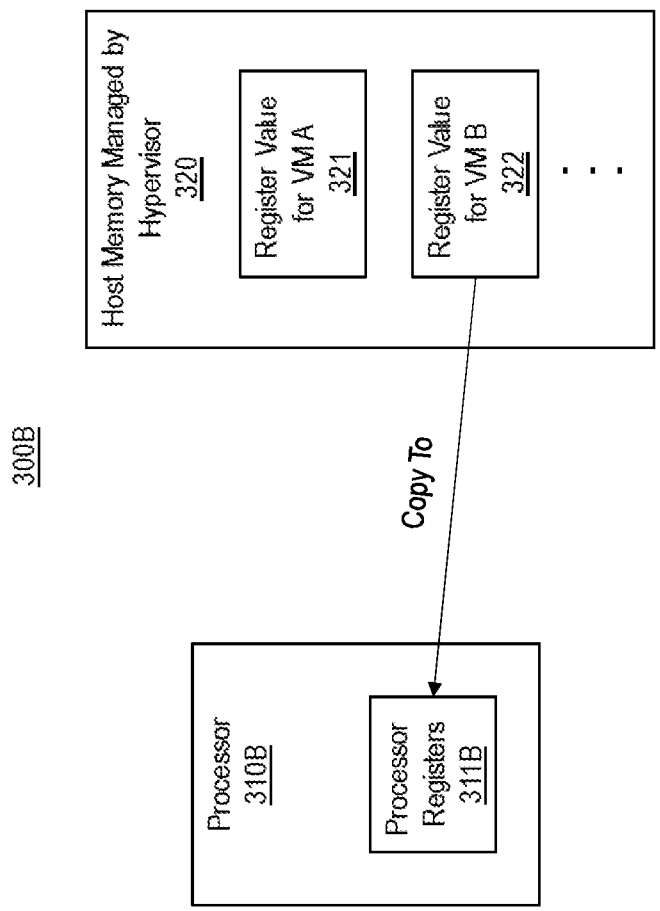

Another way of managing guest states is to copy a guest's state information to its natural level in the memory hierarchy whenever it is activated by the hypervisor and to copy it back when a different guest is activated. FIG. 3B illustrates such an example embodiment 300B of guest state management by copying. As illustrated in FIG. 3B, the host memory 320 managed by hypervisor similarly stores register value for each guest partitions VMs A and B in the register context block 321, 322. However, unlike that in FIG. 3A, the hypervisor here copies the entire guest register contents 322 into the processor 310B's register file 311B at the time the VM B is activated (after saving the registers of the previous guest back to the memory 320).

The choice between indirection and copying can depend on, for example, the frequency of use and whether the guest state being managed by the hypervisor is held in a different type of hardware resources than on a native system. For frequently used state information, such as the general-purpose registers, it may be preferable to swap the state of the virtual machine to the corresponding physical resource each time the virtual machine is activated. However, as illustrated in FIGS. 3A and 3B, in either case, the register value 321, 322 of each VM is often held in the main memory 320 of the host platform as part of a register context block.

In addition to VMs' state management, memory management is also worth discussing. In a VM environment, each of the guest partitions has its own set of virtual memory tables, which are also called "first level" memory page tables. Address translation in each of the first level memory page tables transforms addresses in its virtual address space to locations in guest physical memory. The guest physical memory here does not correspond to the host physical memory on the host computing system. Instead, the guest physical address (GPA) undergoes a further mapping to determine the address in the physical memory of the host hardware, also called host physical address (HPA). This GPA-to-HPA mapping is performed by another set of virtual memory tables of the host computing system, which are also called "second level" or nested memory page tables. Note that the combined total size of the guest physical memory of all the guests could be bigger than the actual physical memory on the system. In embodiments, the hypervisor maintains its own swap space, distinct from the swap space of each of the guests, and hypervisor manages physical memory by swapping guest physical pages into and out of its own swap spaces. Further, the states of every virtually or physically allocated page, and its corresponding attributes, is stored in a list, called page frame number (PFN) list. A track of virtually or physically allocated pages are stored in a database, called PFN database.

Figure 4:
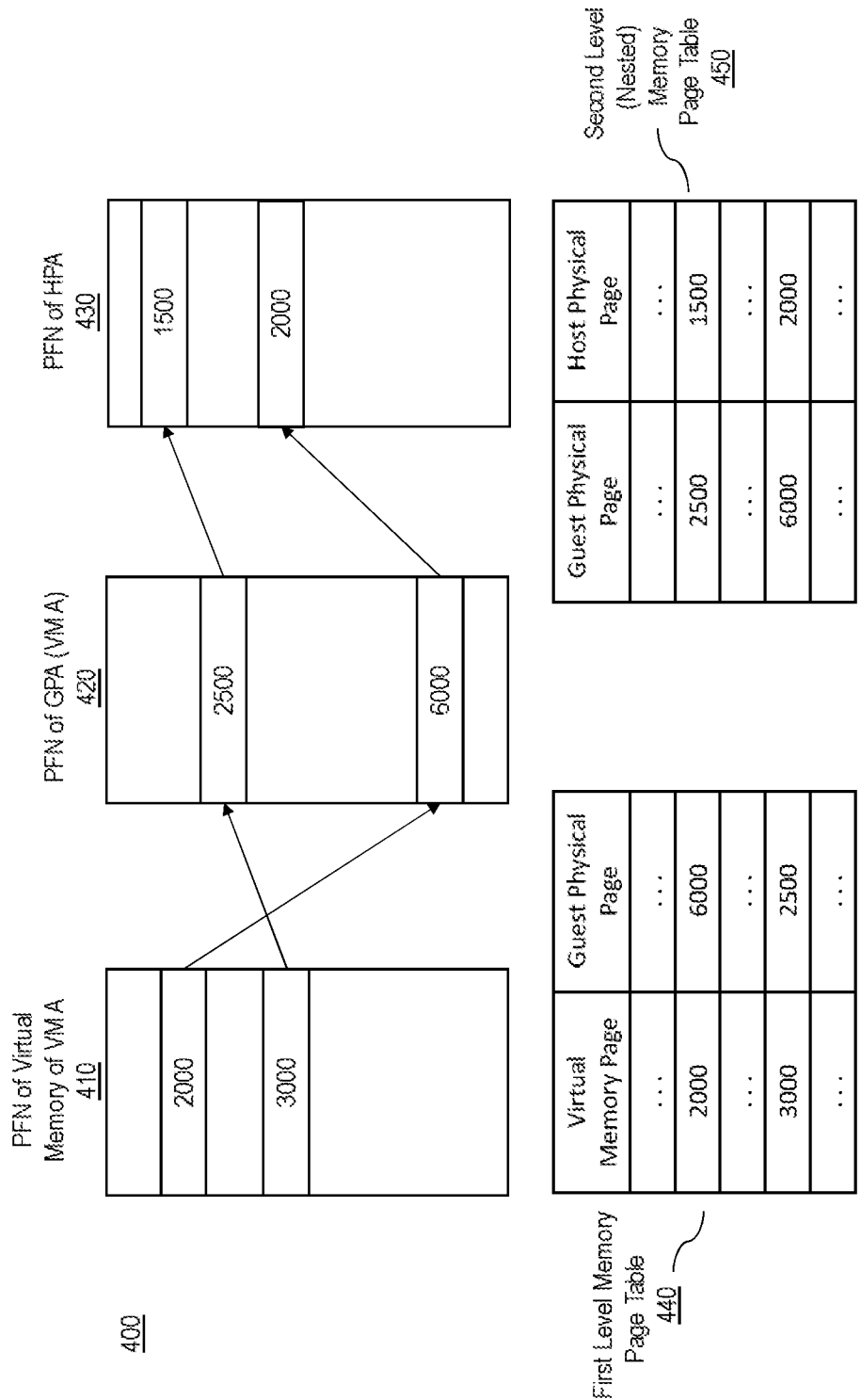
FIG. 4 illustrates an example embodiment 400 of memory virtualization using multiple-stage memory page tables.

FIG. 4 illustrates an example embodiment 400 of memory virtualization using multiple-stage memory page tables 440 and 450. Each entry in the first level memory table 440 maps a location (e.g., a PFN) in the PFN database 410 of virtual memory to a location (e.g., a PFN) in a PFN database 420 of guest physical memory. As illustrated in FIG. 4, the portion of PFN database 410 tracks the virtually allocated pages of the programs running on VM A; and the portion of PFN database 420 tracks the guest VM's physical memory of VM A. Further, in order to convert a GPA to a HPA, the hypervisor also maintains a second level memory page table 450 mapping the guest physical page to host physical pages. There is also a PFN database 430 that tracks the physical memory of the host computing system.

As illustrated in FIG. 4, the physical page frame numbered 1500 is assigned to a guest physical page frame numbered 2500, which is then assigned to a virtual memory page frame numbered 3000. Similarly, a physical page frame 2000 is assigned to a guest physical page frame numbered 6000, which is then assigned to a virtual memory page frame numbered 2000. The remaining physical memory pages may be allocated either to other VMs or to the hypervisor itself. These remaining physical memory pages, including the ones allocated to the hypervisor itself to record register values of each VM (e.g., memory 320), are also tracked by the PFN database 430.

FIG. 4 is merely a schematic diagram for illustrating a simplified concept of memory management using multi-stage page tables. Additional mechanisms may be implemented to achieve the same or similar memory management purposes. For example, in some embodiments, page translation is supported by a combination of a page table and a translation lookaside buffer (TLB).

Having described virtual environments and how a hypervisor manages and virtualizes various hardware resources with reference to FIGS. 1A-4, specific embodiments of hypervisor hot restart will now be explained with respect to FIGS. 5A and 5B.

Figure 5A:
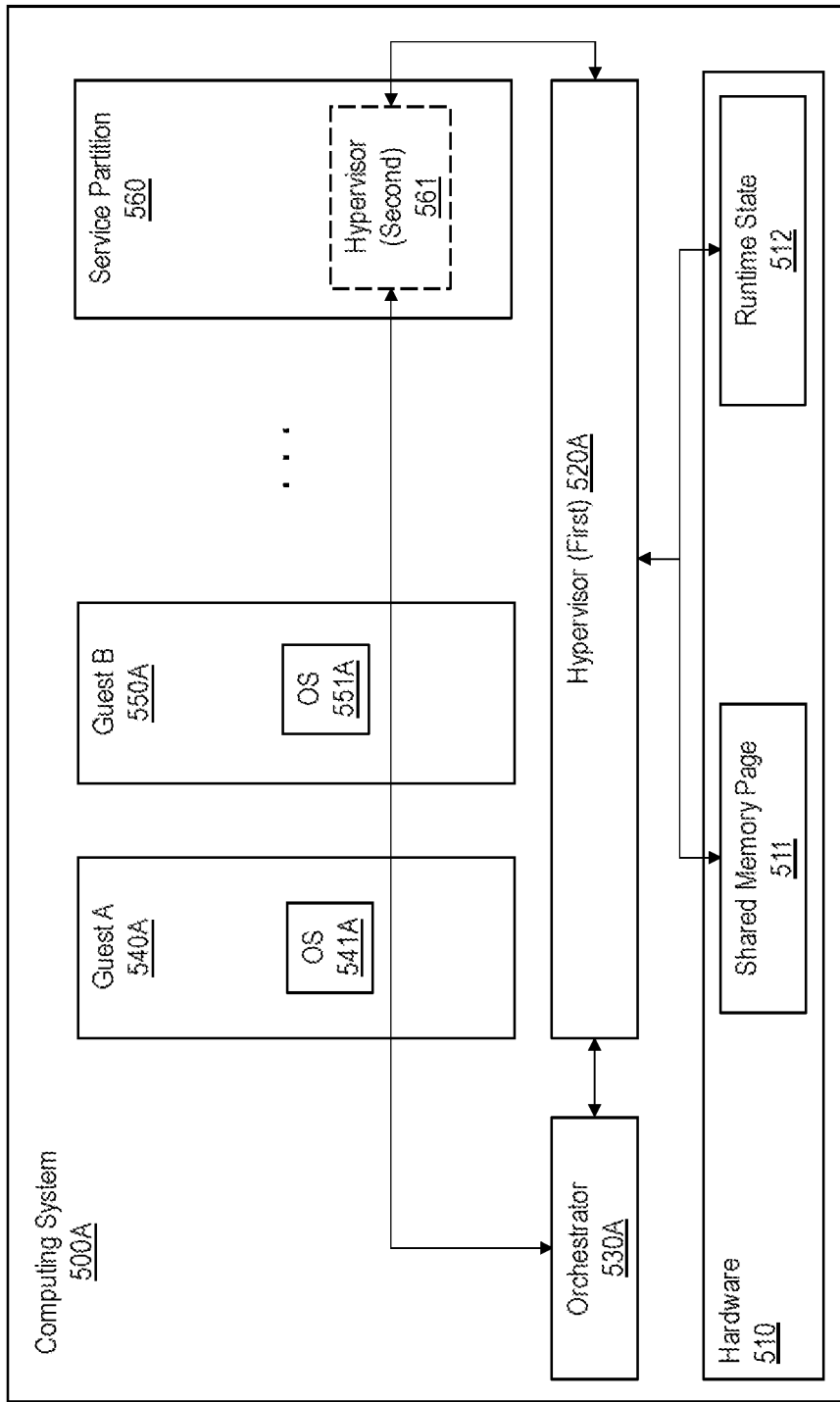
FIGS. 5A and 5B illustrate example computing systems, in which a hypervisor hot restart is enabled.

FIG. 5A illustrates an example computing system 500A, in which a hypervisor hot restart is enabled. The computing system 500A may contain a native VM system as illustrated in FIG. 1A, in which the hypervisor 520A is the only software that executes in the highest privilege level defined by the system architecture. Alternatively, the computing system 500A may contain a hosted VM system, in which the hypervisor 520A is installed on a computing system that is already running a host OS.

Regardless of whether the computing system 500A contains a native VM system or a hosted VM system, during a hypervisor hot restart, a new partition, called a service partition 560, is generated. In embodiments, the service partition 560 is treated differently from the other partition types. At the time the service partition 560 is created, hardware resources, including at least some processor resource(s) and memory resource(s), are allocated to the service partition 560. In some embodiments, the allocation of hardware resources may be based on user input(s). In alternate embodiments, the hypervisor 520A or the component created the service partition 560 automatically allocates a predetermined portion of processor resources and/or memory resources to the service partition 560.

The allocation of processor resource may specify a total amount of processing power the service partition 560 needs and leave the allocation of available processors to workload management software, or the service partition 560 or the hypervisor 520A may specify that specific processors in the system be dedicated for the service partition 560's use. The service partition 560 or the hypervisor 520A can specify that the service partition 560 needs a certain number of processors but that the service partition 560 is willing to share these processors with other partitions. For example, if a total of eight processing units is needed by the service partition 560, the service partition 560 or the hypervisor 520A can specify either that the service partition 560 needs eight processors dedicated to itself or that the service partition 560 needs sixteen processors, but only half the available compute power in each of the processors. The allocation of memory (including RAM and/or hard disk) may specify an amount of memory in chunks of a particular granularity, e.g., 1 MB.

The service partition 560 is then initialized. Any component in the trusted computing base (TCB) can be tasked to create and/or initialize the service partition 560. In some embodiments, the first hypervisor 520A is part of the TCB, and the first hypervisor 520A generates and/or initializes the service partition 560. The initialization process includes bootstrapping, which involves a series of actions, each action bringing to life a capability that allows the next action to be performed, until eventually the entire system is brought to life. In some embodiments, the hypervisor 520A builds a loader block for a second hypervisor 561. The execution of the initializing code allows other aspects of the service partition 560 to be initialized. As illustrated in FIG. 5A, unlike other regular guest partitions 540A, 550A, in which a conventional OS 541A, 551A is loaded, a hypervisor 561 is loaded into the service partition 560. For clarity, hereinafter, the hypervisors 520A and 561 are called a first hypervisor 520A and a second hypervisor 561. In some embodiments, initializing the second hypervisor 561 may also include offering the second hypervisor read-only specific access to certain physical resources 510.

The purpose of hypervisor hot restart is to eventually replace the first hypervisor 520A with the second hypervisor 561 with minimal to imperceptible interruption to guest virtual machines. Before the second hypervisor 561 replaces the first hypervisor 520A, the first hypervisor 520A initializes the second hypervisor 561 with the available system invariants (e.g., features that the hardware resource(s) 510 support), and then synchronizes runtime state 512 with the second hypervisor 561. In some embodiments, the runtime state 512 is stored in a memory (e.g., a RAM) that is managed by the hypervisor 520A. As described with respect to FIGS. 3A, 3B, and 4, runtime state 512 may include hardware architectural state like register value 321, 322 of each guest partition (e.g., guest A 540A, 550A), virtualization hardware state like second level memory page table(s) 450 of each guest partition (e.g., guest A 540A, 550A), and/or software defined state like PFN database 430 associated with first hypervisor 520A.

In some embodiments, the communications between the first hypervisor 520A and the second hypervisor 561 during the initialization and synchronization are orchestrated via an orchestrator 530A. The first hypervisor 520A allows and supports the orchestrator 530A to register and complete certain requests received from the second hypervisor 561. The orchestrator 530A is a software component of the host computing system 500A that is configured to arrange communications between the first hypervisor 520A and the second hypervisor 561. In some embodiments, the first hypervisor 520A is part of the system's trusted computing base (TCB), and the orchestrator 530A is executed in a trusted execution environment (TEE) to uphold the trustworthiness of inputs generated for the second hypervisor.

In some embodiments, the orchestrator 530A may use inverse hypercalls to transmit state to second hypervisor 561, and/or the second hypervisor 561 may use intercepts to request from the orchestrator 530A some service (e.g., property of a physical resource that the second hypervisor 561 does not have access to). In some embodiments, the orchestrator 530A shares a portion of a memory page 511 with the second hypervisor 561, such that data can be efficiently passed amongst the orchestrator 530A, the first hypervisor 520A, and the second hypervisor 561. In some embodiments, the orchestrator 530A issues inverse hypercalls to the second hypervisor following the hypercall application binary interface (ABI) to migrate relevant state.

As described above, once the service partition 560 is created and loaded, the second hypervisor 561 first needs to obtain various system invariants, such as the features of the hardware resources 510. In some embodiments, there is a strict coupling between the features that the first hypervisor 520A sees and the features the second hypervisor 561 will see.

Alternatively, in other embodiments, there is loose coupling between the first and second hypervisors. The orchestrator 530A may query the first hypervisor via hypercalls and/or query the hardware resource(s) directly to obtain features and properties of the hardware resource(s) pertinent to initialization of the second hypervisor 561. For example, the second hypervisor 561 may try to read a CPUID or MSR value. However, being in a virtual machine itself, it may only have access to the virtualized values, not the physical values of the underlying physical computing system. In such a case, the orchestrator 530A may invoke a hypercall to the first hypervisor 520A to obtain the corresponding physical value of the corresponding physical resource. For example, the second hypervisor 561 may want to query processor support for XSAVE features and instructions. If the first hypervisor 520A, doesn't support virtualizing XSAVE, the orchestrator 530A may query the properties of the underlying processor and determine that the processor supports XSAVE. The obtained query results may also be stored in the shared memory page 511, such that the second hypervisor 561 would have access to the query results. In some cases, the second hypervisor 561 may not be able to obtain every feature of the hardware resources 510. In some embodiments, such features will be left as unknown during the initialization, and be obtained later after devirtualization.

In addition to obtaining the system invariants, the runtime state of the first hypervisor 520A is also synchronized with the second hypervisor 561. The runtime state includes at least dynamic system state and logical software state. The dynamic system state includes guest visible hardware architecture state, including but not limited to, general purpose registers, and control registers. The dynamic system state also includes virtualization instruction set architecture ISA specific hardware state, including but not limited to, state of guest VMs, such as virtual central processing unit (CPU) state, second level page tables (also known as nested page tables), and a list of assigned hardware devices (e.g., network card). The synchronizing the first hypervisor's runtime state 512 includes at least synchronizing one or more second level memory page tables and/or one or more PFN databases to the second hypervisor 561. The second level memory tables are the memory page tables that map the GPA of each guest partition to the HPA (e.g., the second level memory page table 450 of FIG. 4). The synchronized PFN database may include the PFN databases that track physical memory of the host computing system (e.g., PFN database 430).

However, after the initial synchronization of runtime state between the two hypervisors 520A and 561, and before the second hypervisor 561 is devirtualized, the guest partitions 540A, 550A are still running on top of the first hypervisor 520A and those guest partitions 540A, 550A still may invoke hypercalls. Once an incoming hypercall is serviced by the first hypervisor 520A, the state of the guest partition 540A or 550A that invoked the hypercall changes, and the second hypervisor 56's previously synced state is no longer accurate. To solve this problem, the incoming hypercalls (before the devirtualization of the second hypervisor) also need to be recorded and synchronized with the second hypervisor 561.

In some embodiments, the orchestrator 530A is also tasked with recording and synchronizing each incoming hypercall. For example, when the first hypervisor 520A receives and services a hypercall invoked by a guest partition 540A, 540B, the orchestrator 530A records the hypercall and a log of actions that occurred during the service of the hypercall by the first hypervisor 520A. At the same time, the orchestrator 530A feeds the hypercall to the second hypervisor 561 via an inverse hypercall. In some embodiments, an instruction point of the second hypervisor 561 is in a hypercall dispatch loop, such that when an inverse hypercall is fed to the second hypervisor 561, the second hypervisor 561 processes it. Receiving the inverse hypercall, the second hypervisor 561 switches the context of the guest partition 540A, 540B that invoked the hypercall and processes the inverse hypercall to rebuild necessary software state and/or dormant hardware state. Upon completion of the inverse hypercall, the second hypervisor 561 then notifies the orchestrator 530A the completion.

In some cases, a sequence of hypercalls are serviced within a short time period, and the orchestrator 530A may only send to the status associated with the last or relevant operation of the sequence of hypercalls. In such a case, the second hypervisor 561 may only replay partial logs of actions, i.e., perform a condensed replay. This process may repeat as many times as necessary until the second hypervisor 561 is completely or at least substantially synchronized with the first hypervisor 520A. Thereafter, the second hypervisor 561 is devirtualized from the service partition 560 to replace the first hypervisor 520A. The devirtualization includes the first hypervisor 520A trampolining to the second hypervisor and ceding all physical hardware control to the second hypervisor 561. In some embodiments, the trampoline may be achieved by reusing an existing control transfer mechanism of the computing system 500A for Kernel Soft Reboot.

In some embodiments, the second hypervisor 561 may undergo additional initialization, validate hardware state, re-initialize hardware, and/or initialize new hardware not previously programmed by the first hypervisor. In some embodiments, the devirtualization may include the first hypervisor 520A freezing all the guest partition(s) 540A, 550A, sending the final state details to the second hypervisor 561, and transferring the guest partition(s) onto the second hypervisor. The second hypervisor then thaws each of the guest partition(s). Once the second hypervisor 561 begins devirtualizing, the first hypervisor 520A is effectively terminated. No other system software, user software, and/or system firmware is permitted to execute during devirtualization. However, DMAs programmed prior to devirtualization may continue to be in flight and complete.

For example, when a guest partition (e.g., child A 540A, 550A) is provided access to a physical device, the guest partition may initiate DMAs with its GPAs as the source or target of the DMA operation. A second level page table (which may be programmed into an input—output memory management unit (IOMMU) by the first hypervisor) translates the GPA to HPA in addition to performing necessary permission checks and provides an HPA to the DMA engine. As noted earlier, the first hypervisor transmitted/synchronized architectural guest state as well as architectural virtualization state to the second hypervisor. The architectural virtual state, among other things, includes second level page tables for the CPU, IOMMU and/or device domain information. Thus, when the second hypervisor devirtualizes and reinitializes the hardware, the second hypervisor carefully programs the hardware with new page-table constructed by itself during the earlier synchronization stage. Since the effective address translation and permission of the new page-table are identical despite being two different instances, all new translation requests from the DMA engine can continue to be in flight and use the same page-table successfully with no loss of fidelity.

Additionally, in some embodiments, the memory foot print of the first hypervisor 520A may be eagerly or lazily reclaimed by the computing system, subject to overall memory pressure.

Figure 5B:
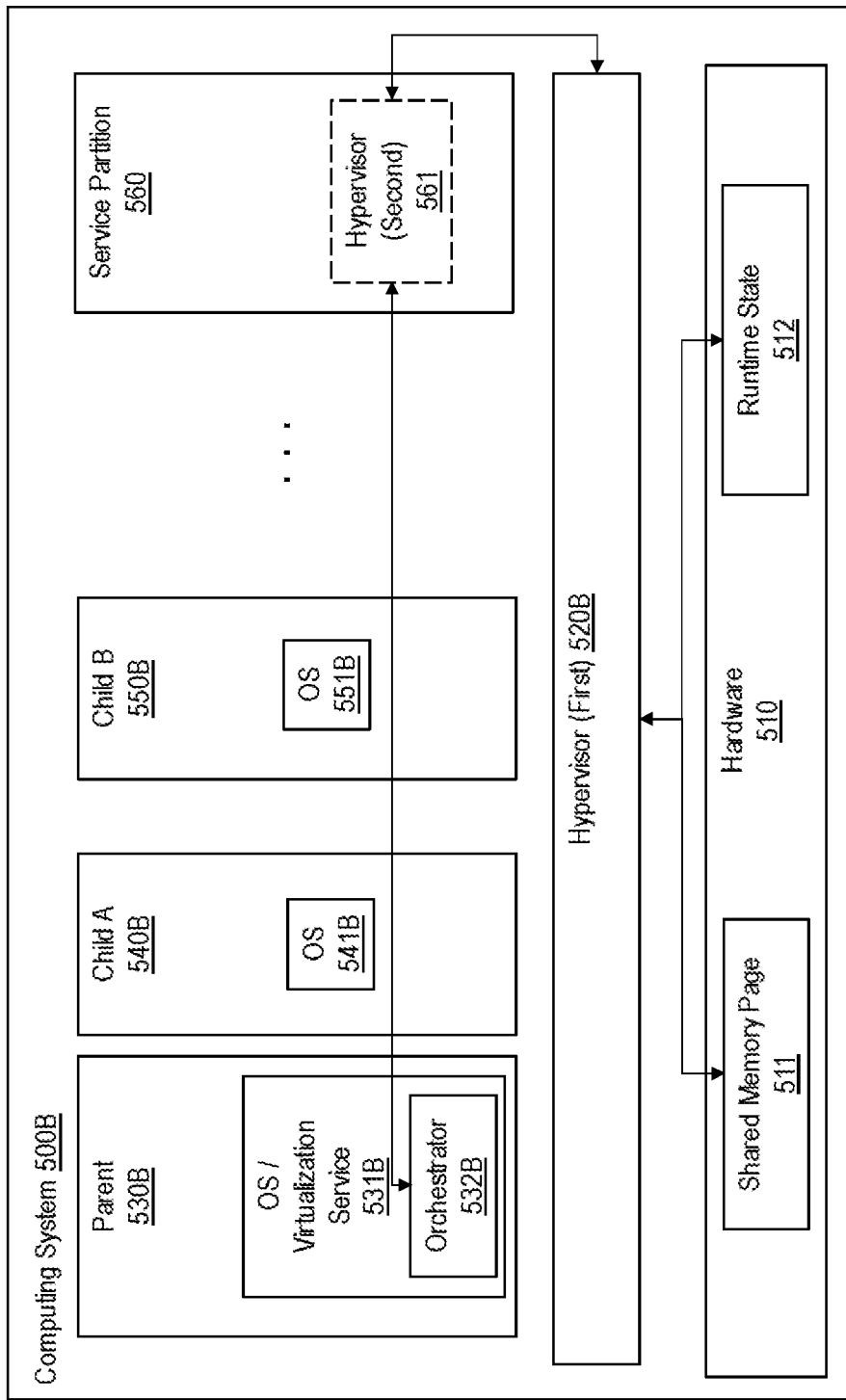

FIG. 5B illustrates another example computing system 500B, in which a hypervisor hot restart is enabled. The computing system 500B corresponds to the computing system 100B of FIG. 1B, in which one of the guest partitions (e.g., a parent partition 110B, 530B is more privileged than the rest of the guest partitions (e.g., child partitions 120B, 540B, 550B). In some embodiments, the parent partition 530B includes a host operating system and/or a virtualization service module 531B, either one of which may be configured to create and manage the child partitions 540B and 550B and handle various system management functions and device drivers. Similar to the embodiment illustrated in FIG. 5A, a service partition 560 is created, a second hypervisor 561 is initialized within the service partition 560, and eventually, the first hypervisor 520B is replaced with the second hypervisor 561 to complete the hypervisor hot restart.

In some embodiments, in the computing system 500B, since the parent partition 530B has a higher level privilege than the child partitions 540B, 550B, an orchestrator 532B may be implemented in the parent partition 530B as part of the host operating system or a virtualization service module 531B of the parent partition 530B. The orchestrator 532B functions, similarly to the orchestrator 530B, to orchestrate the communications between the first hypervisor 520B and the second hypervisor 561. The elements 541B, 551B of FIG. 5B are similar to the elements 541A, 551A of FIG. 5A, therefore, will not be further discussed.

Additionally, in some embodiments, the hot restart of the hypervisor 520A, 520B may also be accompanied with a kernel soft reboot or reset of a guest partition 540A, 550A, 530B, 540B, 550B. In a kernel soft reboot, a guest partition 540A, 550A, 530B, 540B, or 550B may be recreated and initialized as a new partition, and the corresponding guest partition's runtime state is synchronized with the new partition. Once all the runtime state of the guest partition is synchronized with the new partition, the new partition can replace the corresponding guest partition to complete the kernel soft reboot of the corresponding guest partition. In some embodiments, only the parent partition 530B is hot restarted accompanying a hot restart of hypervisor 520B. Alternatively, or in addition, each of the guest partitions 540A, 550A and/or child partitions 540B, 550B is hot restarted with a hot restart of hypervisor 520A, 520B.

Some embodiments restart VM-related components within the parent partition 530B, without restarting the host operating system within the parent partition 530B. For example, some embodiments restart the virtualization service module 531B in connection with a hypervisor hot restart, without restarting a host operating system 113B. In this way, it is possible to upgrade and restart a hypervisor, together with its operating-system level management components, without restarting the host operating system 113B.

The hypervisor hot restart described herein substantially reduces the interruption time caused to the running guest VMs, unlike conventional hypervisor restarts. Unlike a regular hypervisor restart, which could take several minutes, depending on the number of VMs being hosted and the amount of hardware resources being managed, the second hypervisor 561 described herein is initialized and synchronized while the first hypervisor 520A or 520B was still running; thus, only a short period of freeze (e.g., less than a second or a few seconds) would occur at each running guest partition, which may not even be noticed by users.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6A:
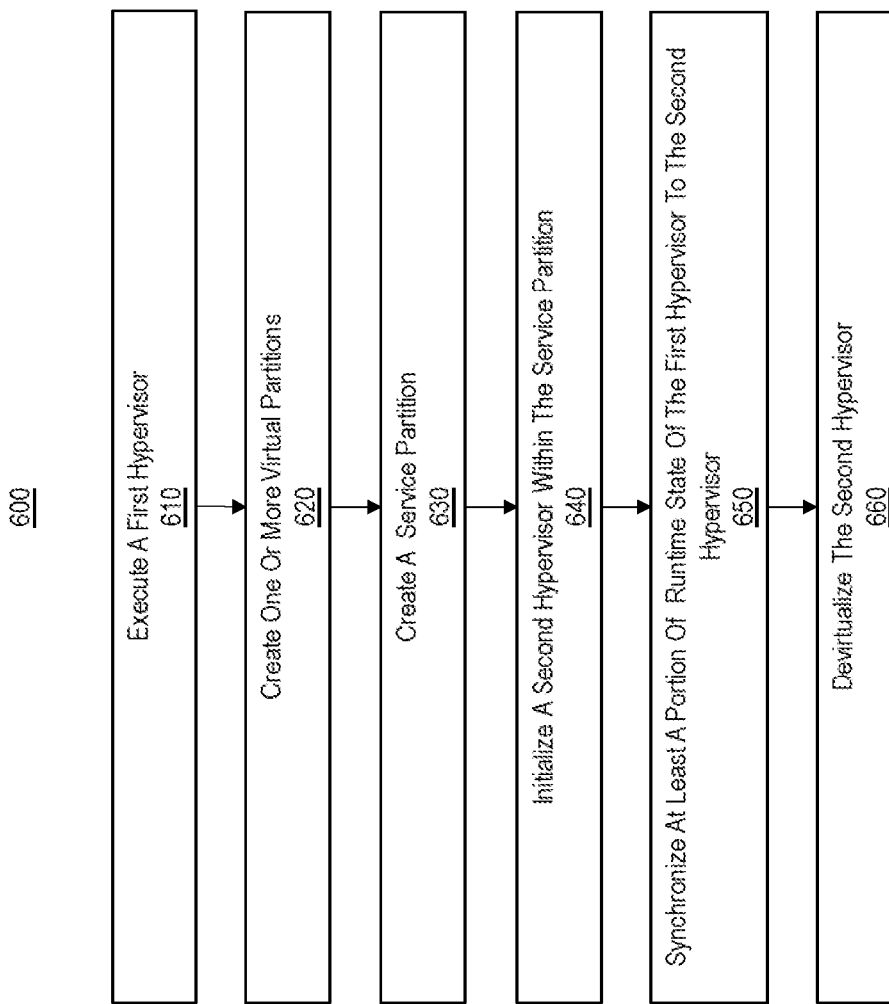
FIG. 6A illustrates a flowchart of an example method for hypervisor hot restart.

FIG. 6A illustrates a flowchart of an example method 600 for hypervisor hot restart. The method 600 is implemented on a computing system that may correspond to the computing system 100A, 100B or 500A, 500B. The method 600 includes executing a first hypervisor (610). The first hypervisor, in turn, creates one or more guest partitions (620), each of which may host a guest operating system. The purpose of a hypervisor hot restart is to replace the first hypervisor with a new hypervisor. When a hypervisor hot restart is performed, the computing system creates a service partition (630) and initializes a second hypervisor (640) within the service partition. Next, at least a portion of runtime state of the first hypervisor is synchronized with the second hypervisor (650). Once the synchronization is completed, or substantially completed, the computing system devirtualizes the second hypervisor to replace the first hypervisor with the second hypervisor (660).

Figure 6B:
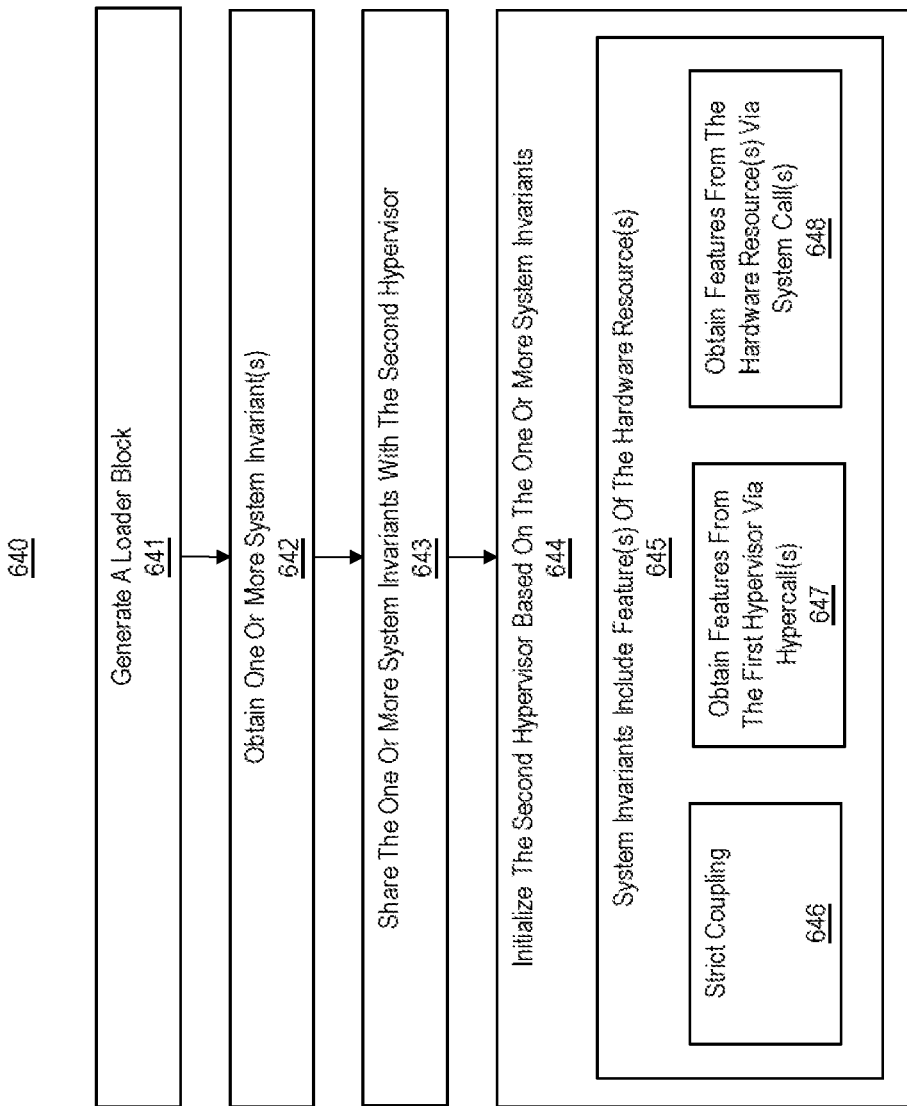
FIG. 6B illustrates a flowchart of an example method for initializing a service partition.

FIG. 6B illustrates a flowchart of an example method 640 for initializing the service partition, which corresponds to the step 640 of FIG. 6A. The method 640 includes generating, by the first hypervisor, a loader block for the second hypervisor (641). The loader block is a logical construct describing some of static system properties and resources for initialization. The method 640 also includes obtaining one or more system invariants (642) and sharing the one or more system invariants with the second hypervisor (643). The second hypervisor is then initialized based on the one or more system invariants (644). In some embodiments, the system invariants include one or more features of the hardware resource(s) of the computing system (645). In some embodiments, there is strict coupling between the first hypervisor and the second hypervisor (646). In some embodiments, there is loose coupling between the first and second hypervisors. In such a case, the one or more feature(s) of the hardware resource(s) may be obtained from the first hypervisor via hypercalls (647) or from the hardware resource(s) directly via system call(s) (648).

Figure 6C:
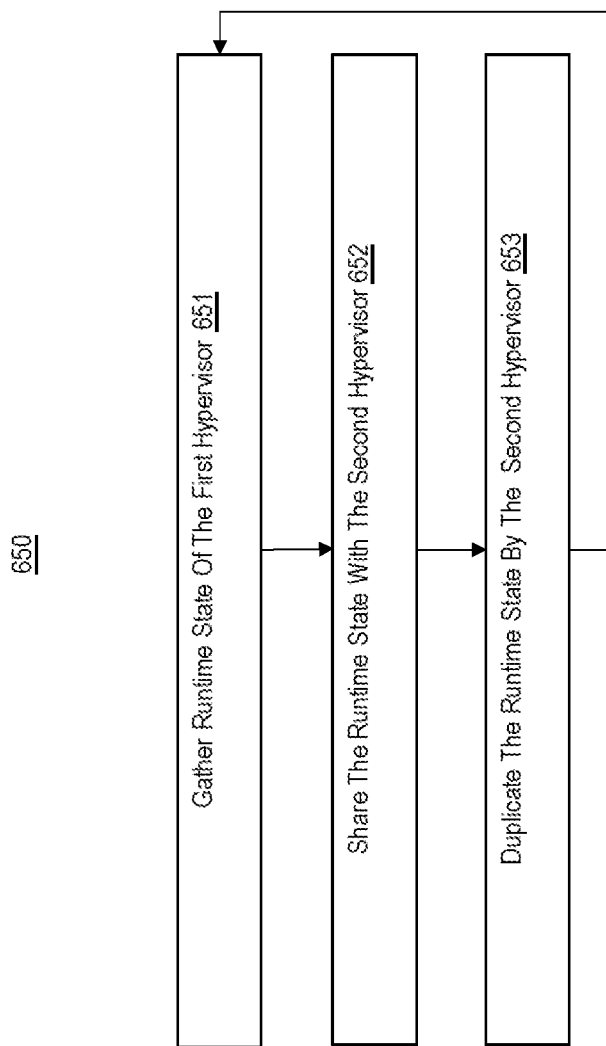
FIG. 6C illustrates a flowchart of an example method for synchronizing a portion of runtime state of a first hypervisor with a second hypervisor.

FIG. 6C illustrates a flowchart of an example method 650 for synchronizing a portion of runtime state of the first hypervisor with the second hypervisor, which corresponds to the step 650 of FIG. 6A. The method 650 may be performed by the orchestrator 530A, 532B of FIGS. 5A or 5B. The method 650 includes gathering runtime state of the first hypervisor (651). The method 650 also includes sharing the runtime state with the second hypervisor (652), which may be performed by the orchestrator 530A, 532B via an inverse hypercall, which may or may not additionally rely on a shared memory page to facilitate signaling and/or message/data passing. The shared runtime state of the first hypervisor is then duplicated by the second hypervisor (653). Before the second hypervisor is devirtualized, the guest partitions running on top of the first hypervisor continues to operate and still can make hypercalls, the gathered runtime state will be inaccurate soon. Thus, this process may repeat several times until the second hypervisor and the first hypervisor are completely or substantially in sync.

Figure 6D:
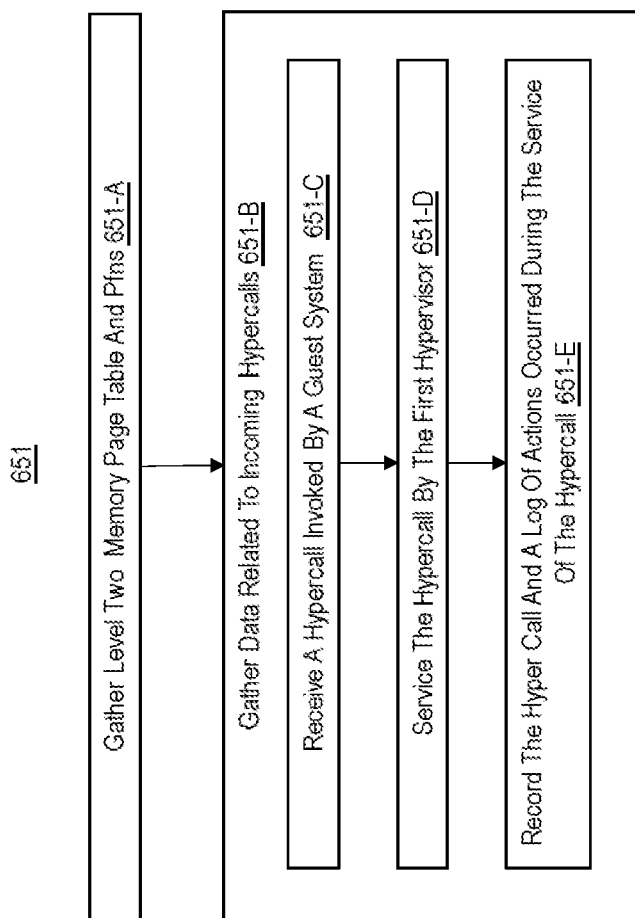
FIG. 6D illustrates a flowchart of an example method for gathering runtime state of the first hypervisor.

FIG. 6D illustrates a flowchart of an example method 651 for gathering runtime state of the first hypervisor, which corresponds to the step 651 of FIG. 6C. The method 651 includes gathering current data related to one or more second level memory page tables and one or more PFN(s) (651-A). The method 651 also includes gathering data related to incoming hypercalls 651-B. In particular, when a hypercall is invoked by a guest partition, the first hypervisor will receive (651-C) and service (651-D) the received hypercall. The computing system (e.g., the orchestrator 530A or 532B) then records the received hypercall and a log of actions occurred during the service of the hypercall (651-E).

FIG. 6E illustrates a flowchart of an example method 652 for sharing runtime state of the first hypervisor with the second hypervisor, which corresponds to the step 652 of FIG. 6C. The method 652 includes feeding one or more second level page table(s) and one or more PFN(s) to the second hypervisor (652-A). The method 652 also includes feeding the incoming hypercall to the second hypervisor (652-B) and feeding the log of actions occurred during the service of the hypercall (by the first hypervisor) to the second hypervisor (652-C).

Figure 6F:
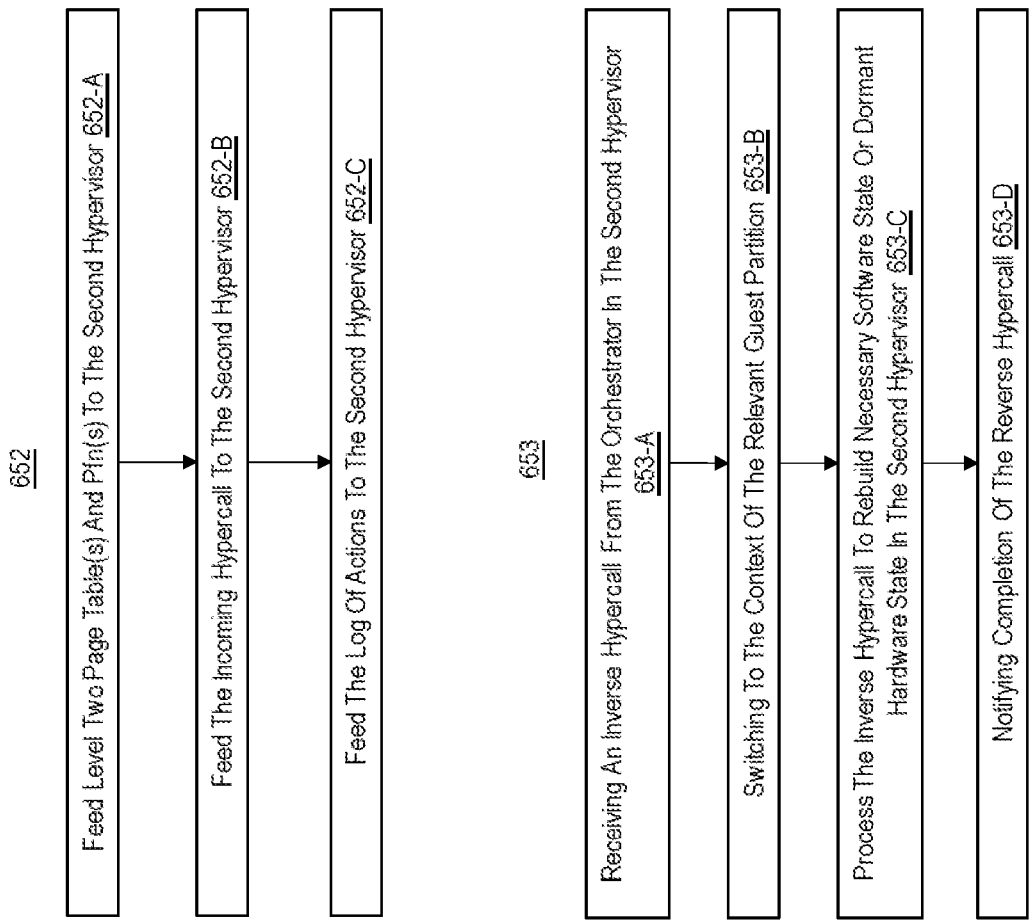
FIG. 6F illustrates a flowchart of an example method for duplicating runtime state of the first hypervisor with the second hypervisor.

FIG. 6F illustrates a flowchart of an example method 653 for duplicating runtime state of the first hypervisor with the second hypervisor, which corresponds to the step 653 of FIG. 6C. The method 653 includes receiving an inverse hypercall from the orchestrator in the second hypervisor (653-A). The second hypervisor then switches the context of the guest partition that invoked the hypercall (653-B) and processes the inverse hypercall to rebuild necessary software state and/or dormant hardware state (653-C). upon completion of the processing of the inverse hypercall, the second hypervisor notifies the orchestrator (653-D).

Figure 6G:
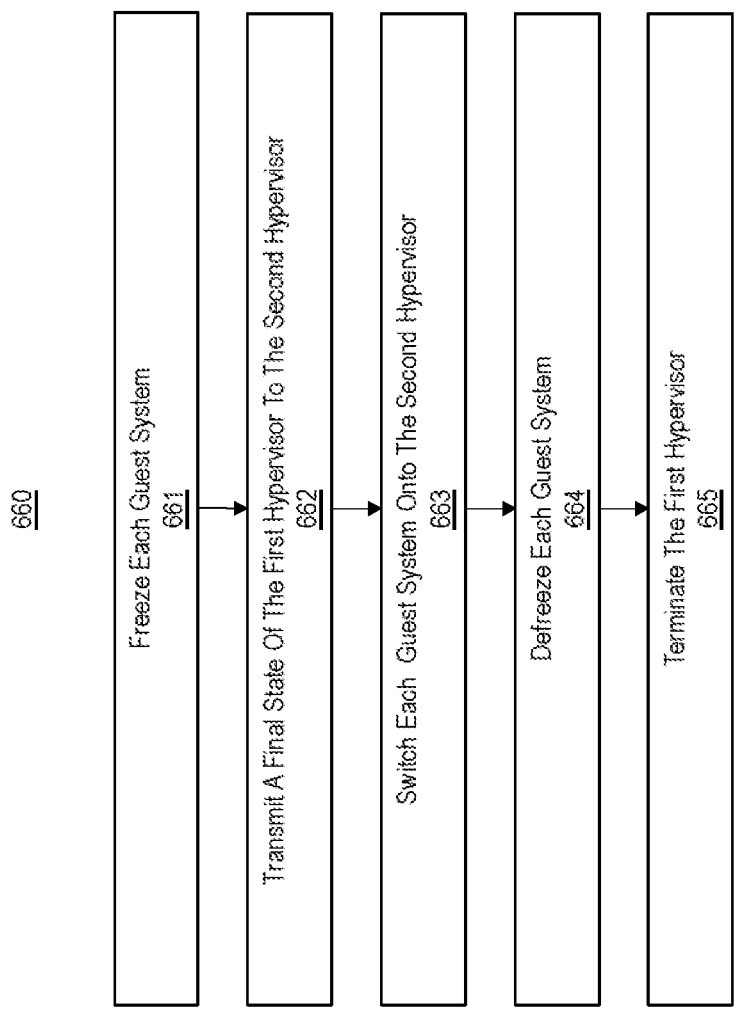
FIG. 6G illustrates a flowchart of an example method for devirtualizing the second hypervisor.

FIG. 6G illustrates a flowchart of an example method 660 for devirtualizing the second hypervisor, which corresponds to the step 660 of FIG. 6A. The method 660 includes freezing each guest partition that is currently running on top of the first hypervisor (661). The final state of the first hypervisor is then transmitted to the second hypervisor (662). Next, each of the guest partitions is switched onto the second hypervisor (663), and the second hypervisor thaws each of the guest partitions (664). Finally, the first hypervisor is terminated (665).

Note, even though the example embodiments described above are implemented in a special partition (e.g., a service partition) for servicing a hypervisor, the overall techniques of pre-initializing data structures and/or migrating/synchronizing runtime state to save time may be used for any portion of any VM.

Finally, because the principles described herein are implemented in the context of a computing system (e.g., computing system 100A, 100B of FIGS. 1A, 1B and/or 500A, 500B of FIGS. 5A or 5B) some introductory discussion of a computing system will be described with respect to FIG. 7.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
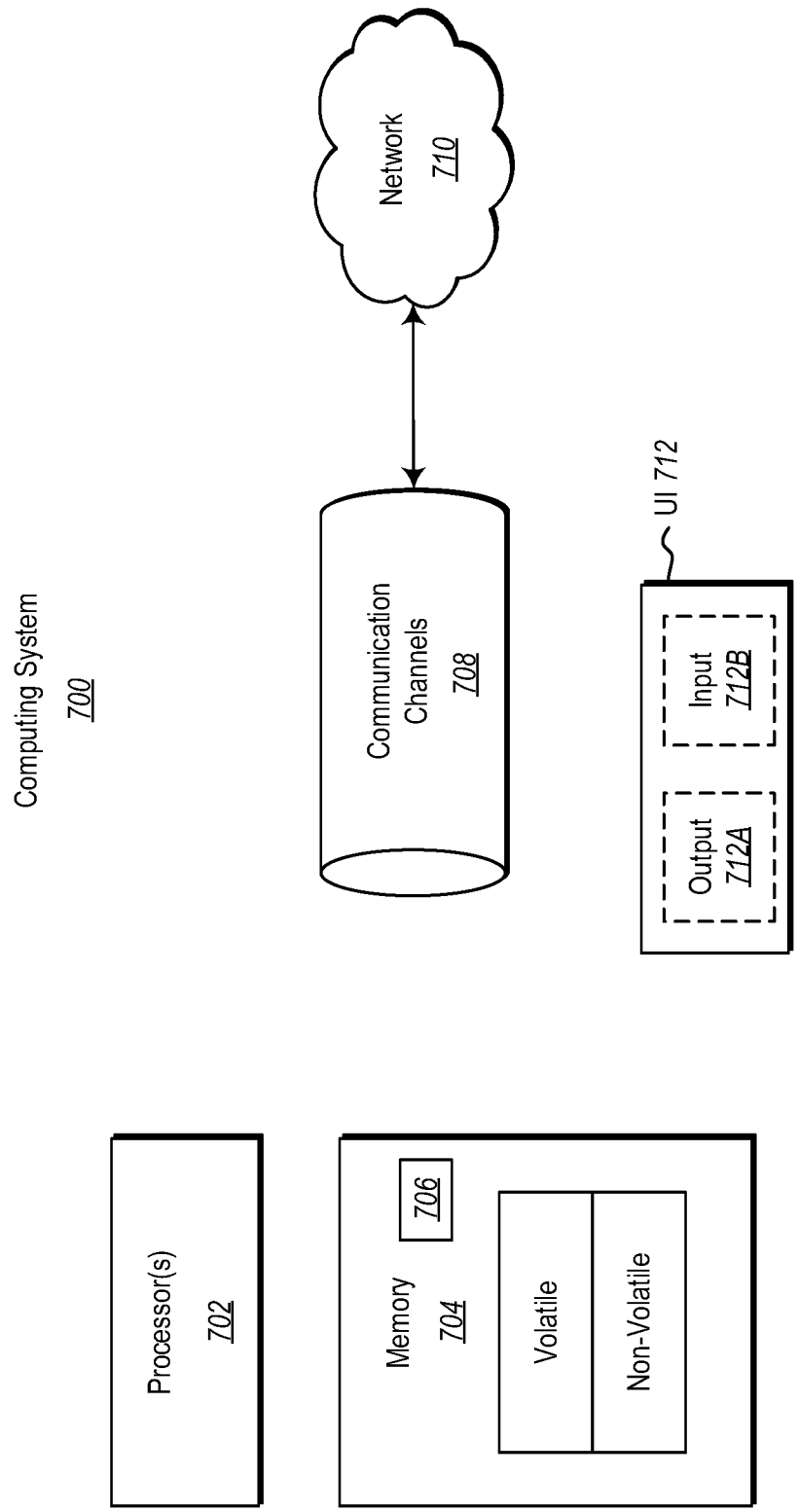
FIG. 7 illustrates an example computing system in which the principles described herein may be employed.

As illustrated in FIG. 7, in its most basic configuration, a computing system 700 typically includes at least one hardware processing unit 702 and memory 704. The processing unit 702 may include a general-purpose processor and may also include a field-programmable gate array (FPGA), an application-specific integrated circuit (ASIC), or any other specialized circuit. The memory 704 may be physical system memory, which may be volatile, non-volatile, or some combination of the two. The term "memory" may also be used herein to refer to non-volatile mass storage, such as physical storage media. If the computing system is distributed, the processing, memory and/or storage capability may be distributed as well.

The computing system 700 also has thereon multiple structures often referred to as an "executable component." For instance, memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component."

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component," "agent," "manager," "service," "engine," "module," "virtual machine," or the like may also be used. As used in this description and in the case, these terms (whether expressed with or without a modifying clause) are also intended to be synonymous with the term "executable component", and thus also have a structure that is well understood by those of ordinary skill in the art of computing.

In the above description, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, holograms, and so forth. Examples of input mechanisms 712B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 700 previously described. The computing systems of the remaining figures may include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 702 and memory 704, as needed to perform their various functions.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects, only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   at least one processor; and
   at least one hardware storage device having stored thereon computer-executable instructions that are executable by the at least one processor to cause the computing system to:
   initialize, using a first hypervisor of the computing system, a service partition within the computing system;

initialize, using the first hypervisor and system invariants of the computing system, a second hypervisor within the service partition;
synchronize a runtime state of the first hypervisor and the second hypervisor; and
replace the first hypervisor with the second hypervisor by devirtualizing the second hypervisor from the service partition.

2. The computing system of claim 1, wherein the first hypervisor executes at a highest privilege level defined by a system architecture of the computing system.

3. The computing system of claim 1, wherein the computing system includes a hosted virtual machine system in which the first hypervisor is installed, and wherein the computing system is running a host operating system at a time when the second hypervisor is initialized.

4. The computing system of claim 1, wherein a processor resource of the at least one processor and a memory resource of the at least one hardware storage device are allocated to the service partition.

5. The computing system of claim 4, wherein allocating the processor resource includes specifying a total amount of processing power that is available for the service partition.

6. The computing system of claim 4, wherein allocating the processor resource includes specifying a specific processor as the processing resource.

7. The computing system of claim 4, wherein allocating the memory resource includes specifying an amount of memory that is available for the service partition.

8. The computing system of claim 1, wherein initializing the service partition includes a bootstrapping operation.

9. The computing system of claim 1, wherein a trusted computing base of the computing system facilitates initializing the service partition.

10. The computing system of claim 1, wherein an operating system (OS) is loaded in a guest partition that is also initialized using the first hypervisor.

11. The computing system of claim 1, wherein initializing the second hypervisor includes offering the second hypervisor read-only access to a physical resource.

12. The computing system of claim 1, wherein the runtime state of the first hypervisor includes a hardware architectural state of the computing system.

13. The computing system of claim 1, wherein communications between the first hypervisor and the second hypervisor are orchestrated via an intermediary computing entity of the computing system.

14. A method for implementing a hypervisor hot restart, the method comprising:
causing a first hypervisor to initialize a service partition in a computing system;
causing the first hypervisor to build a loader block for a second hypervisor in the service partition;
causing the first hypervisor to initialize the second hypervisor within the service partition;
causing the first hypervisor to migrate a runtime state of the first hypervisor to the second hypervisor; and
replacing the first hypervisor with the second hypervisor, wherein replacing the first hypervisor with the second hypervisor includes devirtualizing the second hypervisor from the service partition.

15. The method of claim 14, wherein the runtime state includes at least one of a hardware architectural state, a virtualization hardware state, or a software defined state associated with the first hypervisor.

16. The method of claim 14, wherein the runtime state includes at least one of a dynamic system state and a logical software state.

17. The method of claim 16, wherein the runtime state includes the dynamic system state, and wherein the dynamic system state includes a guest visible hardware architecture state comprising information related to a general purpose register and a control register.

18. The method of claim 14, wherein migrating the runtime state of the first hypervisor to the second hypervisor includes synchronizing at least one of a second level memory page of the computing system or a page frame number database of the computing system to the second hypervisor.

19. A method for implementing a replacement of a first hypervisor with a second hypervisor in a computing system, said method comprising:
causing a first hypervisor to initialize a service partition in a computing system, wherein the service partition omits an operating system;
causing the first hypervisor to build a loader block for a second hypervisor in the service partition;
causing the first hypervisor to initialize the second hypervisor within the service partition, the initializing using information included in the loader block;
causing the first hypervisor to synchronize a runtime state of the first hypervisor and the second hypervisor; and
replacing the first hypervisor with the second hypervisor by devirtualizing the second hypervisor from the service partition.

20. The method of claim 19, wherein the first hypervisor is a part of a trusted computing base of the computing system.

* * * * *